United States Patent
Engel et al.

(10) Patent No.: US 12,263,827 B2
(45) Date of Patent: Apr. 1, 2025

(54) MODEL-BASED PREDICTIVE CONTROL OF A VEHICLE TAKING INTO ACCOUNT A TIME OF ARRIVAL FACTOR

(71) Applicant: ZF Friedrichshafen AG, Friedrichshafen (DE)

(72) Inventors: Valerie Engel, Markdorf (DE); Andreas Wendzel, Grünkraut (DE); Michael Wechs, Weißensberg (DE); Maik Dreher, Tettnang (DE); Lorenz Fischer, Friedrichshafen (DE); Oliver Schneider, Tettnang (DE); Christian Baumann, Friedrichshafen (DE); Edgar Menezes, Ravensburg (DE); Felix Spura, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 221 days.

(21) Appl. No.: 17/776,946

(22) PCT Filed: Mar. 5, 2020

(86) PCT No.: PCT/EP2020/055771
§ 371 (c)(1),
(2) Date: May 13, 2022

(87) PCT Pub. No.: WO2021/175423
PCT Pub. Date: Sep. 10, 2021

(65) Prior Publication Data
US 2022/0402476 A1 Dec. 22, 2022

(51) Int. Cl.
*B60W 20/11* (2016.01)
*B60W 50/00* (2006.01)
*G01C 21/34* (2006.01)

(52) U.S. Cl.
CPC ........ *B60W 20/11* (2016.01); *B60W 50/0097* (2013.01); *G01C 21/3469* (2013.01);
(Continued)

(58) Field of Classification Search
CPC ............. B60W 20/11; B60W 2300/10; B60W 2300/12; B60W 2300/125;
(Continued)

(56) References Cited

U.S. PATENT DOCUMENTS

| 10,407,076 B2 | 9/2019 | Luo | |
|---|---|---|---|
| 2019/0056233 A1* | 2/2019 | Liu | G01C 21/3484 |

(Continued)

FOREIGN PATENT DOCUMENTS

| CN | 109910890 A | 6/2019 |
|---|---|---|
| CN | 108684203 B | 5/2021 |

(Continued)

OTHER PUBLICATIONS

International Search Report (English Translation) PCT/EP2020/055771, dated Oct. 14, 2020. (3 pages).
(Continued)

*Primary Examiner* — Jaime Figueroa
*Assistant Examiner* — Zachary Joseph Wallace
(74) *Attorney, Agent, or Firm* — Dority & Manning, P.A.

(57) ABSTRACT

A processor unit (3) for model-based predictive control of a vehicle (1) taking into account an arrival time factor is configured to calculate a trajectory for the vehicle (1) based at least in part on at least one arrival time factor, with the trajectory including an entire route (20) to a specified destination (19) at which the vehicle (1) is to arrive, and with the at least one arrival time factor influencing an arrival time of the vehicle (1) at the specified destination (19). Additionally, the processor unit (3) is configured to optimize a section of the trajectory for the vehicle (1) for a sliding prediction (Continued)

horizon by executing a model-based predictive control (MPC) algorithm (13), where the MPC algorithm (13) includes a longitudinal dynamic model (14) of a drive train (7) of the vehicle (1) and a cost function (15) to be minimized.

14 Claims, 2 Drawing Sheets

(52) U.S. Cl.
CPC .............. *B60W 2050/0037* (2013.01); *B60W 2050/0075* (2013.01); *B60W 2300/10* (2013.01); *B60W 2300/125* (2013.01); *B60W 2555/60* (2020.02); *B60W 2556/50* (2020.02); *B60W 2720/103* (2013.01)

(58) Field of Classification Search
CPC ......... B60W 2555/60; B60W 2556/50; B60W 2720/103; B60W 50/0097; G01C 21/3469
See application file for complete search history.

(56) References Cited

U.S. PATENT DOCUMENTS

| | | | | |
|---|---|---|---|---|
| 2020/0086849 | A1* | 3/2020 | Colavincenzo | B60L 1/02 |
| 2020/0293009 | A1* | 9/2020 | Quirynen | G05B 13/041 |
| 2021/0331604 | A1* | 10/2021 | Kita | G06Q 10/083 |

FOREIGN PATENT DOCUMENTS

| | | |
|---|---|---|
| DE | 102014008429 A1 | 12/2015 |
| DE | 102015004792 A1 | 12/2015 |
| DE | 102014013618 A1 | 3/2016 |
| DE | 112015000924 B4 | 1/2019 |
| DE | 102018209997 A1 | 12/2019 |
| WO | WO2018104850 | 6/2018 |
| WO | WO 2019/243276 | 12/2019 |

OTHER PUBLICATIONS

Johannesson, Lars et al. "Predictive Energy Management of Hybrid Long-haul Trucks", Control Engineering Practice, Pergamon Press, Oxford, GB, vol. 41, 2015, pp. 83-97; https://doi.org/10.1016/j.conengprac.2015.04.014; ISSN: 0967-0661.

Difilippo, Gianvito et al. "A Cloud Optimizer for Eco Route Planning of Heavy Duty Vehicles" 2018 IEEE Conference on Decision and Control (CDC), 2018, pp. 7142-7147 DOI: 10.1109/CDC.2018.8619149; ISBN: 978-1-5386-1395-5. XP055738100, the whole document.

Chinese Office Action (English Translation) for CN App. No. 202080079801.5, dated Nov. 25, 2024. (11 pages).

* cited by examiner

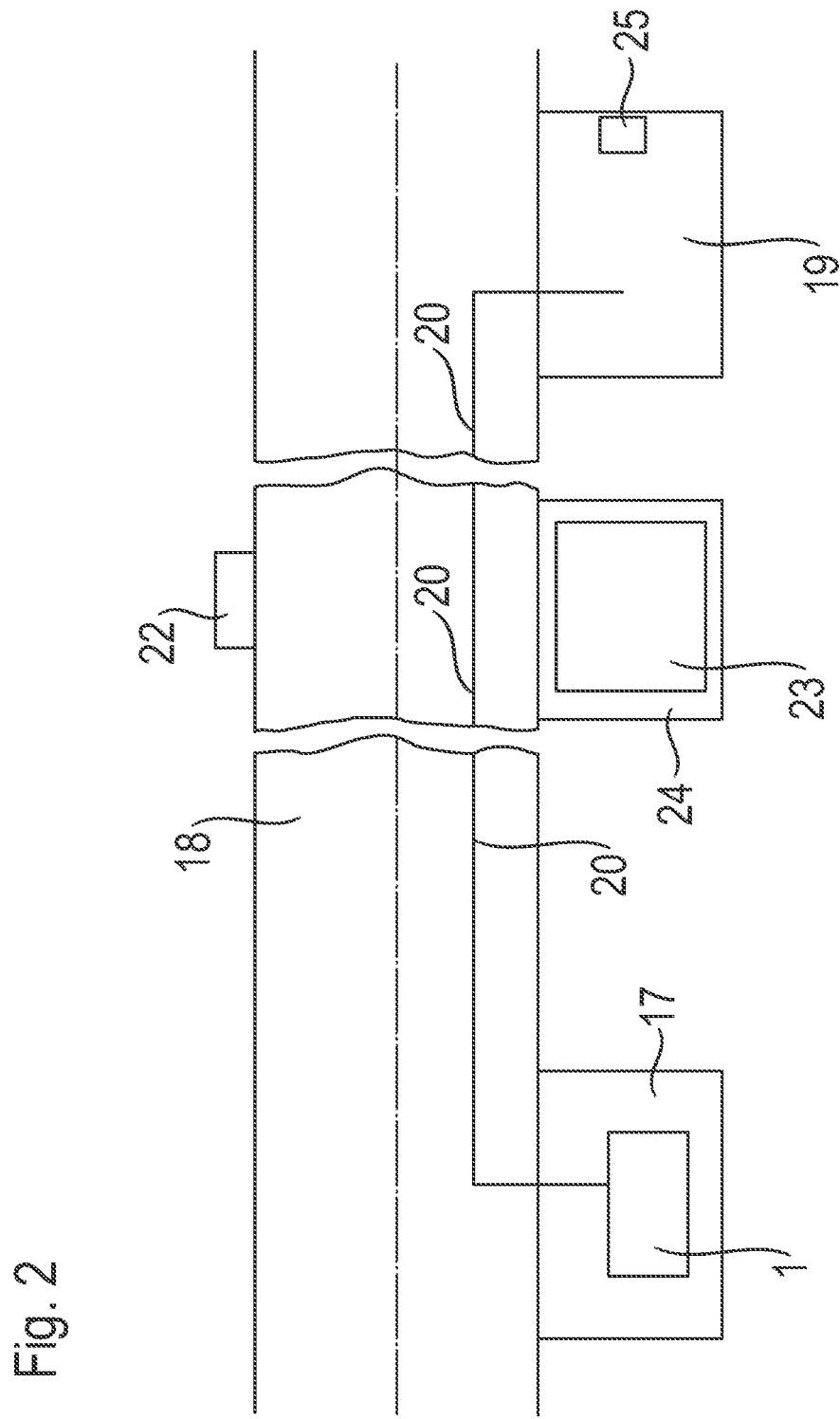

MODEL-BASED PREDICTIVE CONTROL OF A VEHICLE TAKING INTO ACCOUNT A TIME OF ARRIVAL FACTOR

CROSS-REFERENCE TO RELATED APPLICATION

The present application is related and has right of priority to PCT/EP2020/055771 filed in the European Patent Office on Mar. 5, 2020, which is incorporated by reference in its entirety for all purposes.

FIELD OF THE INVENTION

The invention relates generally to a processor unit, a driver assistance system, a vehicle, a method, and a computer program product associated with model-based predictive control of the vehicle taking into account at least one time of arrival factor.

BACKGROUND

Methods of model predictive control (MPC) are utilized in the field of closed-loop trajectory control, in particular, in the area of closed-loop prime mover control in motor vehicles. Based on route information available online and a necessary computing time, a driving strategy in a model prediction control of a vehicle is usually calculated for a limited prediction horizon or range. As a result, an arrival time of the vehicle at the destination is not predictable, and a trajectory of the vehicle is also not optimized in this regard. In addition, refueling stops and charging stops of the vehicle remain unaccounted for.

SUMMARY OF THE INVENTION

An improved MPC of a drive train of a motor vehicle is described herein that provides energy-efficient and time-efficient route planning. In particular, an optimization of a ground speed of a vehicle is provided for an optimal energy consumption and/or an optimal driving time to a desired local destination. In addition to a route topology and a position of refueling options and charging options, further information and influences on the arrival of the vehicle at the desired local final destination, such as, for example, necessary break periods, are taken into account. The optimization is carried out for purely electric vehicles and plug-in hybrid vehicles, as the result of which the utilization of electric charging stations is not absolutely necessary and one further degree of freedom for the optimization problem arises.

According to the present invention, the model predictive control of a vehicle is expanded by the calculation of the complete route and trajectory with regard to arrival time factors, which influence the driving time and the time of arrival of the vehicle at a desired local destination. Examples of the arrival time factors are break periods (private individual, truck driver, bus driver), times for loading a truck, times for refueling/charging the battery, information regarding availability of charging stations, traffic volume, and traffic jams and weather conditions on the route. Likewise, a prediction of ground speed and energy consumption is carried out with regard to the specification of a desired arrival time or a desired range.

In this sense, according to a first aspect of the invention, a processor unit is provided for the model predictive control of a vehicle with regard to an arrival time factor. The processor unit is configured for calculating a trajectory for the vehicle with regard to at least one arrival time factor. The trajectory includes or takes into account an entire route to a specified destination at which the vehicle is to arrive. The arrival time factor influences an arrival time of the vehicle at the specified destination. The trajectory for the vehicle calculated in this way is relatively crude, wherein, for example, no gears have been specified to the vehicle yet. The specified destination is a position at which the vehicle is to arrive. Starting from a start position, the route extends to the destination. The "entire route" includes the entire course of the route between the start and the destination. The prediction horizon or range of the model predictive control, however, is sliding and detects a particular portion of the entire route until the destination is reached. The destination is specified by a driver of the vehicle, for example, via input on a navigation unit of the vehicle. Alternatively, the destination is specified, for example, by an external unit, for example, by a command center of a vehicle fleet situated outside the vehicle.

The trajectory for the vehicle is generated, for example, by a route algorithm, which is embedded in an autonomous driving system (AD system). The AD system typically includes a module for perceiving the environment with sensors and a planning module. The planning module has multiple levels, for example, a navigation level on a larger scale (for example, over multiple kilometers [km]; the vehicle trajectory from start to destination being selected and calculated using the navigation level on the larger scale), and a navigation level on a smaller scale (for example, based on the upcoming 50 to 100 meters [m], depending on the speed of the vehicle; the course and speed in the close vicinity of the vehicle being selected by the navigation level on the smaller scale in order to determine how the vehicle is to move in traffic).

The processor unit is also configured for optimizing a section of the trajectory for the vehicle for a sliding prediction horizon by executing an MPC algorithm, which includes a longitudinal dynamic model of a drive train of the vehicle and a cost function to be minimized, such that the cost function is minimized. The optimized trajectory for the sliding prediction horizon is finer than the speed trajectory for the entire route and specifies, in particular, gears for the vehicle. The calculation of the vehicle trajectory for the entire route is therefore carried out separately from the MPC-based optimization of the vehicle trajectory within the sliding prediction horizon. Particularly, for each new prediction horizon, a new or updated portion of the vehicle trajectory for the entire route is optimized. In addition, the processor unit forms the above-described planning module ("top level" planning module), which plans the entire vehicle trajectory with regard to the arrival time factors. This planning module then transmits portions of the entire vehicle trajectory to the MPC algorithm, by which an optimal trajectory of the vehicle within the prediction horizon is ascertained. In order to take the temporal information into account, the planning module sets a suitable point at the end of the portion that is transmitted to the MPC algorithm, which corresponds to the destination point in time at the end of the portion.

In addition, the processor unit is configured for controlling, by an open-loop system, the vehicle, in particular an electric machine of the vehicle, based on the ascertained, optimized trajectory. The processor unit is configured for transmitting the trajectory for the vehicle, which has been optimized by the MPC algorithm, to a target generator, which is implemented, in particular, by a software module. By this software module, the processor unit converts the mathematically optimal trajectory for the vehicle into actually evaluatable component signals. For example, a speed trajectory of the vehicle is optimally planned by the MPC for the next 500 m. In this case, the target generator would utilize the manipulated variables and setpoint values from the trajectory, which correspond to the current point in time.

The trajectory for the vehicle ascertained and optimized by the processor unit is utilized, in particular, to provide an autonomous or at least semi-autonomous driving function for the vehicle. This driving function is provided by a driver assistance system of the vehicle. The autonomous driving function enables the vehicle to travel autonomously, i.e., without a vehicle occupant controlling the vehicle (the driver has handed over the control of the vehicle to the driver assistance system). Thus, the autonomous driving function includes the vehicle being configured—in particular by the central processor unit—for carrying out, for example, steering, turn-signaling, acceleration, and braking maneuvers without human intervention and controlling, by an open-loop system, in particular, external lighting and signaling, such as turn-signal lights of the vehicle. The semi-autonomous driving function is understood as a driving function that assists a driver of the vehicle in the control of the vehicle, in particular during steering, turn-signaling, acceleration and braking maneuvers, wherein the driver still has the control of the vehicle.

The method of model predictive control (MPC) was selected in order to find, in any situation under established marginal conditions and constraints, an optimal solution for a so-called "driving efficiency" driving function, which is to provide an efficient driving style. The MPC method is based on a system model that describes the behavior of the system. In addition, the MPC method is based on an objective function or on a cost function that describes an optimization problem and determines which state variables are to be minimized. The state variables for the "driving efficiency" driving function are therefore, in particular, the vehicle speed or the kinetic energy, the energy remaining in the battery, and the driving time. Energy consumption and driving time are optimized, in particular, based on the uphill grade of the upcoming route and constraints for speed and drive force, and based on the current system state.

The objective function and/or the cost function of the "driving efficiency" driving strategy includes, in particular, two terms, by which an energy consumption as well as a driving time to the specified destination are minimized. As a result, depending on the selection of weighting factors, which are associated with the terms, a low speed is not always evaluated as optimal and, thus, the situation is avoided in which the resultant speed is always at the lower edge of the permitted speed.

The present invention also makes it possible that the driver influence no longer must be relevant for the energy consumption and the driving time of the motor vehicle, in that, in particular, an electric machine for driving the vehicle is controlled by the processor unit based on an input variable for the electric machine, which is ascertained by executing the MPC algorithm. By the input variable, in particular, an optimal prime mover operating point of the electric machine is set. As a result, an optimal regulation of the optimal speed of the motor vehicle is carried out.

The longitudinal dynamic model of the drive train includes a vehicle model with vehicle parameters and drive train losses (in part, approximated characteristic maps). In particular, findings regarding upcoming route topographies (for example, curves and uphill grades) are incorporated into the longitudinal dynamic model of the drive train. In addition, findings regarding speed limits on the upcoming route are also incorporated into the longitudinal dynamic model of the drive train.

The cost function has exclusively linear and quadratic terms. As a result, the overall problem has the form of a quadratic optimization with linear constraints and a convex problem results, which is solved well and quickly. The objective function or the cost function is formulated with a weighting (weighting factors), wherein, in particular, an energy efficiency, a driving time, and a ride comfort are calculated and weighted. An energy-optimal speed trajectory is calculated online for an upcoming horizon on the processor unit, which particularly forms an integral part of a central control unit of the motor vehicle. By utilizing the MPC method, in addition, the target speed of the motor vehicle is cyclically recalculated based on the current driving mode and the upcoming route information.

Current state variables are measured and appropriate data is recorded and supplied to the MPC algorithm. In this way, route data from an electronic map is updated, in particular cyclically, for the sliding prediction horizon (for example, 500 m) ahead of the vehicle. The route data includes, for example, uphill grade information, curve information, and information about speed limits. Moreover, a curve curvature is converted, via a maximum permissible lateral acceleration, into a speed limit for the motor vehicle. In addition, a position finding of the motor vehicle is carried out, in particular via a Global Navigation Satellite System (GNSS) signal for the precise localization on the electronic map.

A minimization, in particular, of the driving time for the prediction horizon and a minimization of consumed energy is carried out by the cost function of the MPC algorithm. In one embodiment, a minimization of torque changes for the prediction horizon is also carried out. With respect to the input for the model predictive control, for example, speed limits, physical limits for the torque, and rotational speeds of the electric machine are supplied to the MPC algorithm as further constraints. In addition, control variables for the optimization are supplied as inputs to the MPC algorithm, in particular the speed of the vehicle (which is proportional to the rotational speed), the torque of the electric machine, and the state of charge of the battery. As the output of the optimization, the MPC algorithm provides an optimal rotational speed and an optimal torque for calculated points in the prediction horizon. With respect to the implementation of the MPC in the vehicle, a software module ("target generator") is connected downstream from the MPC algorithm, which determines a currently relevant state and transmits this to a power electronics unit.

While the vehicle is moved to the specified destination (in particular assisted by a semi-autonomous or autonomous driving function), the driver can or must take one or multiple break(s), in order to recover. In this sense, the processor unit is configured for taking break periods of a driver of the vehicle into account as an arrival time factor in the calculation of the trajectory for the vehicle. A break is understood to mean that the vehicle is brought to a standstill, for example, in a rest area or in a parking space, and that the vehicle is left at a standstill for a period of time (the break period). The breaks are, in part, required by law, for example, for drivers of a truck or a bus. The break is taken before the start of the journey to the specified local final destination and/or during the journey to the specified local final destination and/or after the journey to the specified local final destination.

When and where the driver takes a break depends on the entire route to the specified local final destination. When the route includes, for example, an expressway, the location at which a break is taken depends on the availability of parking spaces or rest areas along the expressway. The point in time at which a break is taken depends, in this example, on how far away the envisioned parking space or rest area is from the current location of the vehicle and the speed at which the vehicle can or is permitted to move to the envisioned parking space or rest area.

The loading and unloading of a vehicle also plays a role in the speed planning for the vehicle in order to enable a journey of the vehicle on the entire route that is as energy-efficient and time-optimized as possible. In this sense, the processor unit in one further embodiment is configured for taking a period of time for loading and/or unloading the vehicle, in particular a truck, into account as an arrival time factor in the calculation of the trajectory for the vehicle.

When this is a hybrid vehicle, which includes an internal combustion engine operated with fossil fuels in addition to an electric motor, a period of time that the vehicle needs for refueling is also relevant. This includes the actual refueling process at a station, but also, for example, necessary times for paying for the fuel that was pumped and driving times from the actual route to a gas station and back to the actual route. Moreover, a period of time for charging a battery is relevant, which provides electrical energy for driving the electric motor. In this sense, the processor unit in one further embodiment is configured for taking a period of time for refueling the vehicle and/or for charging a battery of the vehicle into account as an arrival time factor in the calculation of the trajectory for the vehicle. In conjunction with the charging of the battery, information regarding the availability of appropriate charging stations for the battery is also taken into account by the processor unit.

In addition, the processor unit takes a traffic volume and/or traffic jam situations and/or weather conditions on the entire route up to the specified destination into account as an arrival time factor in the determination of the trajectory for the vehicle.

In addition, it is advantageously provided that the processor unit carries out the prediction of ground speed and energy consumption with regard to the specification of a desired arrival time. Alternatively, or additionally, this is also carried out with regard to the specification of a desired range.

In addition, information regarding available parking spaces at rest areas, in particular for trucks, is utilized for the speed planning and the route planning. In this sense, the processor unit is configured for taking an availability of parking spaces at rest areas into account as an arrival time factor in the calculation of the trajectory for the vehicle.

Additionally, a communication with a depot is carried out by the processor unit (for example, via infrastructure Car2I) in order to reserve a point in time for a loading and/or an unloading of the vehicle. As a result, a reduced waiting time is enabled and the time that has been freed up is utilized instead for more energy-efficient travel of the vehicle.

In one further embodiment, the drive train includes an electric machine and a battery. The cost function includes, as a first term, an electrical energy weighted with a first weighting factor and predicted according to the longitudinal dynamic model, which is provided within the prediction horizon by a battery of the drive train for driving the electric machine. The cost function includes, as a second term, a driving time weighted with a second weighting factor and predicted according to the longitudinal dynamic model, which the vehicle requires in order to cover the entire distance predicted within the prediction horizon. The processor unit is configured for determining an input variable for the electric machine by executing the MPC algorithm as a function of the first term and as a function of the second term such that the cost function is minimized. This embodiment makes it possible for the objective function or the cost function of a "driving efficiency" driving strategy to include one further term in addition to the energy consumption, as the result of which, additionally, the driving time is also minimized. As a result, depending on the selection of the weighting factors, a low speed is not always evaluated as optimal and, thus, the problem that the resultant speed is always at the lower edge of the permitted speed does not exist.

Energy consumption and driving time are both evaluated and weighted at the end of the horizon. This term is therefore active only for the last point of the horizon. In this sense, the cost function in one embodiment includes an energy consumption final value—weighted with the first weighting factor—which the predicted electrical energy assumes at the end of the prediction horizon, and the cost function includes a driving time final value—weighted with the second weighting factor—which the predicted driving time assumes at the end of the prediction horizon.

In order to ensure comfortable driving, additional terms are introduced for penalizing torque surges. In this sense, the cost function includes a third term having a third weighting factor, wherein the third term includes a value of a torque that the electric machine provides for driving the motor vehicle, which is predicted according to the longitudinal dynamic model, and wherein the processor unit is configured for determining the input variable for the electric machine by executing the MPC algorithm as a function of the first term, as a function of the second term, and as a function of the third term such that the cost function is minimized.

For the first point in the horizon, the deviation from the most recently set torque is evaluated as negative in order to ensure that there is a seamless and smooth transition during the change-over between an old trajectory and a new trajectory. In this sense, the third term includes a first value of a torque that the electric machine provides for driving the motor vehicle to a first waypoint within the prediction horizon—weighted with the third weighting factor, where such torque is predicted according to the longitudinal dynamic model. The third term includes a zeroth value of a torque that the electric machine provides for driving the motor vehicle to a zeroth waypoint—weighted with the third weighting factor, where the zeroth waypoint is situated directly ahead of or before the first waypoint. The zeroth torque is, in particular, a real—not merely predicted—torque provided by the electric machine. In the cost function, the zeroth value of the torque is subtracted from the first value of the torque.

Alternatively, the third term includes a first value of a drive force that the electric machine provides for driving the motor vehicle to a first waypoint within the prediction horizon—weighted with the third weighting factor, where such drive force is predicted according to the longitudinal dynamic model. The third term includes a zeroth value of a drive force that the electric machine provides for driving the motor vehicle to a zeroth waypoint—weighted with the third weighting factor, where the zeroth waypoint is situated directly ahead of the first waypoint, wherein, in the cost function, the zeroth value of the drive force is subtracted from the first value of the drive force.

The waypoints that are taken into account by the MPC algorithm are, in particular, discrete waypoints that follow one another along the route at a certain frequency. In this sense, the zeroth waypoint and the first waypoint represent discrete waypoints, wherein the first waypoint immediately follows the zeroth waypoint. The zeroth waypoint is situated before the prediction horizon. The zeroth torque value is measured or determined for the zeroth waypoint. The first waypoint represents, in particular, the first waypoint within the prediction horizon. The first torque value is predicted for the first waypoint. Therefore, the actually determined zeroth torque value is comparable with the predicted first torque value.

Additionally, excessively high torque gradients within the horizon are disadvantageous, and so, in one embodiment, these are already penalized in the objective function. For this purpose, the quadratic deviation of the drive force per meter is weighted and minimized in the objective function. In this sense, the cost function includes a fourth term having a fourth weighting factor, wherein the fourth term includes a gradient of the torque predicted according to the longitudinal dynamic model or an indicator value for a gradient of the torque predicted according to the longitudinal dynamic model. The processor unit is configured for determining the input variable for the electric machine by executing the MPC algorithm as a function of the first term, as a function of the second term, as a function of the third term, and as a function of the fourth term such that the cost function is minimized.

In one embodiment, the fourth term includes a quadratic deviation of the gradient of the torque, which has been multiplied by the fourth weighting factor and summed. In addition, the cost function includes a quadratic deviation—which has been summed with the fourth weighting factor—of a drive force that the electric machine provides in order to propel the motor vehicle one meter in the longitudinal direction. In this sense, the fourth term includes a quadratic deviation—which has been multiplied by the fourth weighting factor and summed—of a drive force that the electric machine provides in order to propel the motor vehicle one meter in the longitudinal direction.

Speed limits, which are established, for example, by road traffic regulations, are hard limits for the optimization, which are not to be exceeded. A slight exceedance of the speed limits is always permissible in reality and tends to be the normal case primarily during transitions from one speed zone into a second zone. In dynamic surroundings, in which speed limits shift from one computing cycle to the next computing cycle, it can happen, in the case of very hard limits, that a valid solution for a speed profile is no longer found. In order to increase the stability of the computational algorithm, a so-called soft constraint is introduced into the objective function. In particular, a so-called slack variable becomes active in a predefined narrow range before the hard speed limit is reached. Solutions that are situated very close to this speed limit are evaluated as poorer, i.e., solutions, the speed trajectory of which maintains a certain distance to the hard limit. In this sense, the cost function includes, as a fifth term, a slack variable weighted with a fifth weighting factor, wherein the processor unit is configured for determining the input variable for the electric machine by executing the MPC algorithm as a function of the first term, as a function of the second term, as a function of the third term, as a function of the fourth term, and as a function of the fifth term such that the cost function is minimized.

In order to respect the physical limits of the drive train components, the tractive force is limited via a limitation of the characteristic map of the electric machine. For example, the battery is the limiting element for the maximum recuperation. In order not to damage the battery, a certain negative power value should not be fallen below.

According to a second aspect of the invention, a driver assistance system is provided for a vehicle, which is driven by an electric machine. The driver assistance system is configured for accessing an input variable for the electric machine by a communication interface, wherein the input variable has been determined by a processor unit according to the first aspect of the invention. The processor unit ascertains the input variable for the electric machine by executing an MPC algorithm as a function of a first term and as a function of a second term of a cost function of the MPC algorithm. The first term represents an electrical energy weighted with a first weighting factor and predicted according to the longitudinal dynamic model of the vehicle, which is provided within a prediction horizon by a battery for driving the electric machine. The second term represents a driving time weighted with a second weighting factor and predicted according to the longitudinal dynamic model, which the vehicle needs in order to cover the entire distance predicted within the prediction horizon. In addition, the driver assistance system is configured for controlling, by an open-loop system, the electric machine based on the input variable.

According to a third aspect of the invention, a vehicle is provided, which includes an electric machine, a battery, and a driver assistance system according to the second aspect of the invention.

The vehicle is, in particular, a motor vehicle, which is driven by a prime mover, for example, an automobile (for example, a passenger car having a weight of less than 3.5 tons [t]), a motorcycle, a motor scooter, a moped, a bicycle, an e-bike or pedelec (acronym for Pedal Electric Cycle), a bus, or a truck (for example, having a weight of more than 3.5 t), or also a rail vehicle, a ship, or an aircraft, such as a helicopter or an airplane. The invention is also utilized in small, lightweight electric vehicles for micromobility, wherein these vehicles are utilized, in particular, in city traffic and for the first mile and the last mile in rural areas. The first mile and the last mile are understood as all routes and paths that are located in the first and last links of a mobility chain. This is, for example, the path from home to the train station or the route from the train station to the workplace. In other words, the invention is usable in all areas of transportation, such as automotive, aviation, nautical science, astronautics, etc. The vehicle belongs, for example, to a vehicle fleet. The vehicle is controlled by a driver, possibly assisted by a driver assistance system. The vehicle is also, for example, remotely controlled and/or (semi-)autonomously controlled, however.

The vehicle is an electric vehicle, a hybrid vehicle, or a plug-in hybrid vehicle. An "electric vehicle" is understood to be a vehicle that is driven by electrical energy. Drive energy in the form of electrical energy is supplied to the electric vehicle. The electrical energy is stored in a battery of the electric vehicle (battery electric vehicle). Alternatively, the electrical energy is supplied, in particular, permanently from the outside, for example, via a bus bar, an overhead contact line, or via induction. A "hybrid vehicle" is understood to be an electric vehicle, which is driven by at least one electric motor and at least one internal combustion engine. The hybrid vehicle obtains energy from a battery as well as from a fuel carried additionally, for example, diesel, gasoline fuel, or gas. A "plug-in hybrid vehicle" is understood to be a hybrid vehicle, the battery of which is charged via an internal combustion engine as well as by a grid, which is located outside the plug-in hybrid vehicle and which is connectable to an electrical terminal of the plug-in hybrid vehicle. A plug-in hybrid vehicle is considered to be a mixed form between a hybrid vehicle and an electric vehicle.

According to a fourth aspect of the invention, a method is provided for the model predictive control of a vehicle with regard to an arrival time factor. The method includes the following steps of:

calculating a trajectory for the vehicle with regard to at least one arrival time factor, wherein the trajectory includes an entire route up to a specified destination at which the vehicle is to arrive, and wherein the arrival time factor influences an arrival time of the vehicle at the specified destination, and optimizing a section of the trajectory for the vehicle for a sliding prediction horizon by executing an MPC algorithm, which includes a longitudinal dynamic model of a drive train of the vehicle and a cost function to be minimized, such that the cost function is minimized.

According to a fifth aspect of the invention, a computer program product is provided for the model predictive control of a vehicle with regard to an arrival time factor. The computer program, when run on a processor unit, instructs the processor unit to calculate a trajectory for the vehicle with regard to at least one arrival time factor, wherein the trajectory includes an entire route up to a specified destination at which the vehicle is to arrive, and wherein the arrival time factor influences an arrival time of the vehicle at the specified destination, and optimize a section of the trajectory for the vehicle for a sliding prediction horizon by executing an MPC algorithm, which includes a longitudinal dynamic model of a drive train of the vehicle and a cost function to be minimized, such that the cost function is minimized.

The comments made in conjunction with the processor unit according to the first aspect of the invention also apply similarly for the driver assistance system according to the second aspect of the invention, for the vehicle according to the third aspect of the invention, for the method according to the fourth aspect of the invention, and for the computer program product according to the fifth aspect of the invention.

BRIEF DESCRIPTION OF THE DRAWINGS

Exemplary embodiments of the invention are explained in greater detail in the following with reference to the diagrammatic drawing, wherein identical or similar elements are labeled with the same reference character, wherein FIG. 2 shows a top-down view of a road on which the vehicle according to FIG. 1 autonomously travels in order to reach a destination point from a starting point.

DETAILED DESCRIPTION

Figure 1:
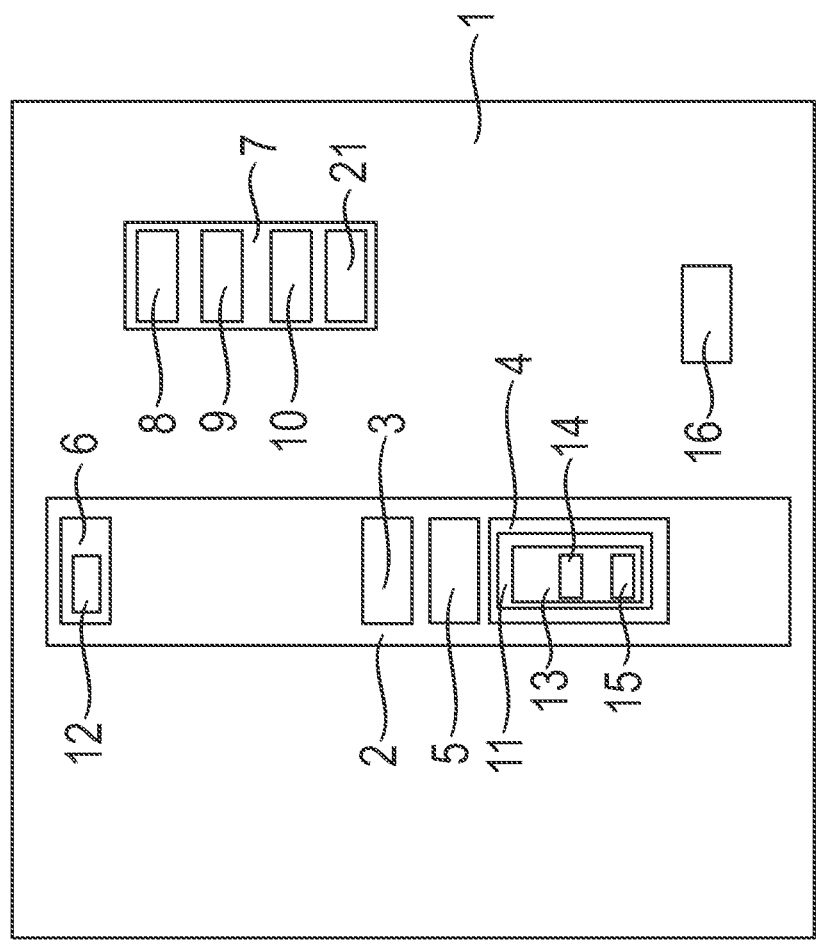
FIG. 1 shows a schematic view of a vehicle including a drive train, which includes an electric machine and a battery.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a vehicle in the form of a motor vehicle 1, for example, a passenger car or a truck. The motor vehicle 1 includes a system 2 for the model predictive control of an electric machine 8 of a drive train 7 of the motor vehicle 1 with regard to an arrival time factor. In the exemplary embodiment shown, the system 2 includes a processor unit 3, a memory unit 4, a communication interface 5, and a detection unit 6 for detecting state data related to the first motor vehicle 1. The motor vehicle 1 also includes a drive train 7, which includes, for example, an electric machine 8, which is operable as a motor and as a generator, a battery 9, and a transmission 10. The electric machine 8, in the motor mode, drives wheels of the motor vehicle 1 via the transmission 10, which has, for example, a constant ratio. The battery 9 provides the electrical energy necessary therefor. The battery 9 is chargeable by the electric machine 8 when the electric machine 8 is operated in the generator mode (recuperation). Optionally, the battery 9 is also chargeable at an external charging station if the motor vehicle 1 is a plug-in hybrid vehicle. Likewise, the drive train of the motor vehicle 1 optionally includes an internal combustion engine 21, which, alternatively or in addition to the electric machine 8, drives the motor vehicle 1. The internal combustion engine 21 is also configurable for driving the electric machine 8 to charge the battery 9.

A computer program product 11 is storable on the memory unit 4. The computer program product 11 is run on the processor unit 3, for the purpose of which the processor unit 3 and the memory unit 4 are connected to each other by the communication interface 5. When the computer program product 11 is run on the processor unit 3, it instructs the processor unit 3 to perform the functions described in conjunction with the drawing and/or to carry out method steps.

The computer program product 11 includes a model or model-based predictive control (MPC) algorithm 13. The MPC algorithm 13 includes a longitudinal dynamic model 14 of the drive train 7 of the motor vehicle 1 and a cost function 15 to be minimized. The processor unit 3 executes the MPC algorithm 13 and determines an optimized trajectory for the motor vehicle 1. A behavior of the motor vehicle 1 is predicted based on the longitudinal dynamic model 14, wherein the cost function 15 is minimized. For example, a rotational speed matched to the optimized trajectory and an optimal torque of the electric machine 8 for calculated points in the prediction horizon result as the output of the optimization by the MPC algorithm 13. For this purpose, the processor unit 3 ascertains an input variable for the electric machine 8, enabling the optimal rotational speed and the optimal torque to set in. The processor unit 3 controls the electric machine 8 based on the ascertained input variable. In addition, this can also be carried out by a driver assistance system 16, however.

The detection unit 6 measures current state variables of the motor vehicle 1, records appropriate data, and supplies these to the MPC algorithm 13. In this way, route data from an electronic map is updated, in particular cyclically, for a prediction horizon (for example, 500 m) ahead of the motor vehicle 1. The route data includes, for example, uphill grade information, curve information, and information about speed limits. Moreover, a curve curvature is converted, via a maximum permissible lateral acceleration, into a speed limit for the motor vehicle 1. In addition, a position finding of the motor vehicle is carried out by the detection unit 6, in particular via a GNSS signal generated by a GNSS sensor 12 for the precise localization on the electronic map. The processor unit 3 accesses this information, for example, via the communication interface 5.

The vehicle 1 in the example shown in FIG. 2 is located in a parking space 17, which is adjacent to a road 18, which leads to a depot 19. The course of the road 18 is represented interrupted due to its length. A driver of the vehicle 1 specifies to the driver assistance system 16 that he/she wants to travel, for example, from the parking space 17 (start) to the depot 19 (destination). The driver assistance system 16 provides an autonomous driving function for the vehicle 1, enabling the vehicle 1 to travel autonomously from the parking space 17 to the depot 19.

For this purpose, the processor unit 3 or the driver assistance system 16 initially generates the entire route 20 from the parking space 17 to the depot 19 and assign a speed of the vehicle 1 to discrete waypoints of this route. In this way, the trajectory for the vehicle 1 is calculated. For this purpose, the processor unit 3 or the driver assistance system 16 utilizes the detection unit 6 and a planning module, which is implemented, for example, as software. The planning module has multiple levels, for example, a navigation level on a larger scale (for example, across multiple km; the trajectory for the vehicle 1 from start 17 to destination 19 being selectable within the navigation level on the larger scale), and a navigation level on a smaller scale (for example, for across the upcoming 50 m to 100 m, depending on the speed of the vehicle 1; the course and speed in the close vicinity of the vehicle 1 being selectable in the navigation level on the smaller scale in order to determine how the vehicle 1 is to move in traffic).

Arrival time factors, which influence an arrival time of the vehicle 1 at the specified destination 19, are taken into account in the determination or calculation of the trajectory for the vehicle 1. In particular, break periods of the driver (for example, a private individual, a truck driver, or a bus driver) of the vehicle 1 are taken into account. In addition, a period of time for loading the vehicle 1, in particular when it is a truck, and times for refueling and/or charging the battery 9 of the vehicle 1 are taken into account. Moreover, information regarding the availability of a charging station 22 for the battery 9 of the vehicle 1, and/or regarding available parking spaces 23 at rest areas 24 for trucks are taken into account. In addition, information regarding a traffic volume, traffic jams, as well as weather conditions on the route 20 are taken into account. The processor unit 3 of the vehicle 1 also communicates with a processor unit 25 of the depot 19 (for example, via a Car2I communication) in order to reserve a point in time for a loading and/or unloading, which are/is matched to the calculated trajectory for the vehicle 1. As a result, a reduced waiting time is enabled and the time is utilized instead for more energy-efficient travel.

If the vehicle 1 starts autonomously in order to reach the depot 19 via the road 18 starting from the parking space 17, the processor unit 3 executes the MPC algorithm 13 and optimizes a particular current section of the trajectory for the vehicle 1 for a sliding (i.e., shifting spatially or on the path) prediction horizon such that the cost function is minimized. For example, the processor unit 3 forms the above-described planning module ("top level" planning module), which plans the entire route 20 and trajectory for the vehicle 1 with regard to the aforementioned arrival time factors. This planning module then transmits sections or portions of the vehicle trajectory for the entire route to the MPC algorithm 13, by which an optimal trajectory of the vehicle 1 within the prediction horizon is ascertained. The processor unit 3 also optionally takes into account an arrival time at the specified destination 19 predefined by the driver of the vehicle 1 or a range specified by the driver of the vehicle 1 as a constraint in the optimization of the trajectory for the vehicle 1.

An exemplary longitudinal dynamic model 14 of the motor vehicle 1 is expressed mathematically as follows:

$$\frac{dv(t)}{dt} = (F_{trac}(t) - F_r(\alpha(t)) - F_{gr}(\alpha(t)) - F_d(v(t)))/m_{eq}$$

Wherein:

v is the speed of the motor vehicle;

$F_{trac}$ is the tractive force that is exerted by the prime mover or the brakes upon the wheels of the motor vehicle;

$F_r$ is the rolling resistance, which is an effect of the deformation of the tires during rolling and depends on the load of the wheels (on the normal force between the wheel and the road) and, thus, on the inclination angle of the road;

$F_{gr}$ is the gradient resistance, which describes the longitudinal component of gravity, which acts upon the motor vehicle during operation uphill or downhill, depending on the gradient of the roadway;

$F_d$ is the drag force of the motor vehicle; and $m_{eq}$ is the equivalent mass of the motor vehicle; the equivalent mass includes, in particular, the inertia of the turned parts of the drive train, which are subjected to the acceleration of the motor vehicle (prime mover, transmission input shafts, wheels).

By converting time dependence into distance dependence $$\frac{d}{ds} = \frac{d}{dt} * \frac{dt}{ds} = \frac{d}{dt} * \frac{1}{v}$$

and coordinate transformation in order to eliminate the quadratic speed term in the aerodynamic drag with $e_{kin} = \frac{1}{2} * m_{eq} * v(t)^2$, the result is:

$$\frac{de_{kin}}{ds} = F_{trac}(s) - F_r(\alpha(s)) - F_{gr}(\alpha(s)) - F_d(e_{kin}(s)).$$

In order to ensure that the problem is quickly and easily solvable by the MPC algorithm 13, the dynamic equation of the longitudinal dynamic model 14 is linearized, in that the speed is expressed, via coordinate transformation, by kinetic energy $de_{kin}$. As a result, the quadratic term for calculating the aerodynamic drag $F_d$ is replaced by a linear term and, simultaneously, the longitudinal dynamic model 14 of the motor vehicle 1 is no longer described as a function of time, as usual, but rather as a function of distance. This fits well with the optimization problem, since the predictive information of the electrical horizon is based on distance.

In addition to the kinetic energy, there are two further state variables, which, within the scope of a simple optimization problem, must also be described in a linear and distance-dependent manner. On the one hand, the electrical energy consumption of the drive train 7 is usually described in the form of a characteristic map as a function of torque and prime mover speed. In the exemplary embodiment shown, the motor vehicle 1 has a fixed ratio between the electric machine 8 and the road on which the motor vehicle 1 moves. As a result, the rotational speed of the electric machine 8 is directly converted into a speed of the motor vehicle 1 or even into a kinetic energy of the motor vehicle 1. In addition, the electrical power of the electric machine 8 is converted into energy consumption per meter via division by the appropriate speed. In order to be able to utilize a corresponding characteristic map of the electric machine 8 for the optimization, it is linearly approximated: Energy$_{perMeter} \geq \alpha_i * e_{kin} \ b_i * F_{trac}$ for all i.

The cost function 15 to be minimized is expressed mathematically as follows:

$$\min\left(-w_{Bat} \cdot E_{Bat}(s_E) + w_{Time} \cdot T(s_E) + w_{Tem} \cdot \sum_{s=1}^{s_E-1}\left(\frac{F_A(s) - F_A(s-1)}{\Delta s}\right)^2 + w_{TemStart} \cdot (F_A(s_1) - F_A(s_0))^2 + \sum_{s=1}^{s_E-1} w_{Slack} \cdot \text{Var}_{slack}\right)$$

Wherein:
$w_{Bat}$ is the weighting factor for the energy consumption of the battery;
$E_{Bat}$ is the energy consumption of the battery;
S is the distance;
$S_{E-1}$ is the distance one time step before the end of the prediction horizon;
$F_A$ is the drive force that is provided by the electric machine, transmitted by a transmission at a constant ratio, and applied at a wheel of the motor vehicle;
$W_{Tem}$ is the weighting factor for torque gradients;
$W_{TemStart}$ is the weighting factor for torque surges;
T is the time that the vehicle needs in order to cover the entire distance predicted within the prediction horizon;
$W_{Time}$ is the weighting factor for the time T;
$S_E$ is the distance to the end of the horizon;
$w_{Slack}$ is the weighting factor for the slack variable; and
Var$_{Slack}$ is the slack variable.

The cost function 15 has exclusively linear and quadratic terms. As a result, the overall problem has the form of a quadratic optimization with linear constraints and a convex problem results, which is solved well and quickly.

The cost function 15 includes, as a first term, an electrical energy $E_{Bat}$ weighted with a first weighting factor $w_{Bat}$ and predicted according to the longitudinal dynamic model, which is provided within a prediction horizon by the battery 9 of the drive train 7 for driving the electric machine 8.

The cost function 15 includes, as a second term, a driving time T weighted with a second weighting factor $W_{Time}$ and predicted according to the longitudinal dynamic model 14, which the motor vehicle 1 needs in order to cover the predicted distance. As a result, depending on the selection of the weighting factors, a low speed is not always evaluated as optimal and, thus, the problem that the resultant speed is always at the lower edge of the permitted speed no longer exists.

The energy consumption and the driving time are both evaluated and weighted at the end of the horizon. These terms are therefore active only for the last point of the horizon.

Excessively high torque gradients within the horizon are disadvantageous. Therefore, torque gradients are already penalized in the cost function 15, namely by the term $$w_{Tem} \cdot \sum_{s=1}^{s_E-1}\left(\frac{F_A(s) - F_A(s-1)}{\Delta s}\right)^2.$$

The quadratic deviation of the drive force per meter is weighted with a weighting factor $W_{Tem}$ and minimized in the cost function. Alternatively to the drive force $F_A$ per meter, the torque $M_{EM}$ provided by the electric machine 8 is instead usable and weighted with the weighting factor $W_{Tem}$, and so the alternative term $$w_{Tem} \cdot \sum_{s=1}^{s_E-1}\left(\frac{M_{EM}(s) - M_{EM}(s-1)}{\Delta s}\right)^2$$

results. Due to the constant ratio of the transmission 10, the drive force and the torque are directly proportional to one another.

In order to ensure comfortable driving, one further term is introduced in the cost function 15 for penalizing torque surges, namely $W_{TemStart} \cdot (F_A(s_1) - F_A(s_0))^2$. In alternative to the drive force $F_A$, the torque $M_{EM}$ provided by the electric machine 8 is instead usable, and so the alternative term $W_{TemStart} \cdot (M_{EM}(s_1) - M_{EM}(s_0))^2$ results. For the first point in the prediction horizon, the deviation from the most recently set torque is evaluated as negative and weighted with a weighting factor $W_{TemStart}$ in order to ensure that there is a seamless and smooth transition during the change-over between an old trajectory and a new trajectory.

Speed limits are hard limits for the optimization that are not permitted to be exceeded. A slight exceedance of the speed limits is always permissible in reality and tends to be the normal case primarily during transitions from one speed zone into a second zone. In dynamic surroundings, where speed limits shift from one computing cycle to the next computing cycle, it can happen, in the case of very hard limits, that a valid solution for a speed profile is no longer found. In order to increase the stability of the computational algorithm, a soft constraint is introduced into the cost function 15. A slack variable Var$_{Slack}$ weighted with a weighting factor $W_{Slack}$ becomes active in a predefined narrow range before the hard speed limit is reached. Solutions that are situated very close to this speed limit are evaluated as poorer, i.e., solutions, the speed trajectory of which maintains a certain distance to the hard limit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 system
3 processor unit
4 memory unit
5 communication interface
6 detection unit
7 drive train
8 electric machine 9 battery
10 transmission
11 computer program product
12 GNSS sensor
13 MPC algorithm
14 longitudinal dynamic model
15 cost function
16 driver assistance system
17 parking space
18 road
19 depot
20 entire route
21 internal combustion engine
22 charging station for the battery of the vehicle
23 truck parking space
24 rest area
25 processor unit of the depot

The invention claimed is:

1. A processor unit (3) for model-based predictive control of a vehicle (1) taking into account an arrival time factor, wherein the processor unit (3) is configured to:
calculate a trajectory for the vehicle (1) based at least in part on at least one arrival time factor, the trajectory including an entire route (20) to a specified destination (19) at which the vehicle (1) is to arrive, the at least one arrival time factor influencing an arrival time of the vehicle (1) at the specified destination (19); and
optimize a section of the trajectory for the vehicle (1) for a sliding prediction horizon by executing a model-based predictive control (MPC) algorithm (13), the MPC algorithm (13) includes a longitudinal dynamic model (14) of a drive train (7) of the vehicle (1) and a cost function (15), the cost function (15) including:
a first term, the first term being an electrical energy predicted according to the longitudinal dynamic model (14) and weighted with a first weighting factor, wherein the electrical energy is provided within the sliding prediction horizon by a battery (9) for driving an electric machine (8) of the drive train (7); and
a second term, the second term being a driving time predicted according to the longitudinal dynamic model (14) and weighted with a second weighting factor, the driving time being required by vehicle (1) to cover an entire distance predicted within the sliding prediction horizon,
wherein the processor unit (3) is configured to execute the MPC algorithm (13) as a function of the first term and as a function of the second term to minimize the cost function and determine an input variable for the electric machine (8).

2. The processor unit (3) of claim 1, wherein the at least one arrival time factor comprises required break periods of a driver of the vehicle (1).

3. The processor unit (3) of claim 1, wherein the at least one arrival time factor comprises one or both of a period for loading and a period for unloading the vehicle (1), with the vehicle (1) being a truck.

4. The processor unit (3) of claim 1, wherein the at least one arrival time factor comprises one or both of a period of time for refueling the vehicle (1) and a period of time for charging a battery (9) of the vehicle (1).

5. The processor unit (3) of claim 1, wherein the at least one arrival time factor comprises an availability of charging stations (22) for the vehicle (1) on the entire route (20).

6. The processor unit (3) of claim 1, wherein the at least one arrival time factor comprises one or more of a traffic volume, traffic jam situations, and weather conditions on the entire route (20) to the specified destination (19).

7. The processor unit (3) of claim 1, wherein the processor unit (3) is configured to optimize the section of the trajectory based at least in part on an arrival time at the specified destination (19) predefined by a driver of the vehicle (1).

8. The processor unit (3) of claim 1, wherein the processor unit (3) is configured to optimize the section of the trajectory based at least in part on a range of the vehicle (1) specified by a driver of the vehicle (1).

9. The processor unit (3) of claim 1, wherein the at least one arrival time factor comprises an availability of parking spaces (23) at rest areas (24).

10. The processor unit (3) of claim 1, wherein the processor unit (3) is further configured for communicating with a processor unit (25) of a depot (19) to reserve one or both of a time for loading the vehicle and a time for unloading the vehicle based at least in part on the trajectory.

11. A driver assistance system (16) for a vehicle (1), the vehicle (1) being driven by an electric machine (8), the driver assistance system (16) being in communication with the processor unit (3) of claim 1, the driver assistance system (16) being configured to:
access the input variable for the electric machine (8) by a communication interface, wherein the input variable has been determined by the processor unit (3); and
control, by way of an open-loop system, the electric machine (8) based on the input variable.

12. A vehicle (3), comprising:
the electric machine (8);
the battery (9); and
the driver assistance system (16) of claim 11.

13. A method for model-based predictive control of a vehicle (1) taking into account an arrival time factor, the method comprising:
calculating a trajectory for the vehicle (1) based at least in part on at least one arrival time factor, the trajectory including an entire route (20) to a specified destination (19) at which the vehicle (1) is to arrive, the at least one arrival time factor influencing an arrival time of the vehicle (1) at the specified destination (19); and
optimizing a section of the trajectory for the vehicle (1) for a sliding prediction horizon by executing a MPC algorithm (13), the MPC algorithm (13) includes a longitudinal dynamic model (14) of a drive train (7) of the vehicle (1) and a cost function (15), the cost function (15) including:
a first term, the first term being an electrical energy predicted according to the longitudinal dynamic model (14) and weighted with a first weighting factor wherein the electrical energy is provided within the sliding prediction horizon by a battery (9) for driving an electric machine (8) of the drive train (7); and
a second term, the second term being a driving time predicted according to the longitudinal dynamic model (14) and weighted with a second weighting factor, the driving time being required by vehicle (1) to cover an entire distance predicted within the sliding prediction horizon,
wherein executing the MPC algorithm (13) comprises executing the MPC algorithm (13) as a function of the first term and as a function of the second term to minimize the cost function and determine an input variable for the electric machine (8).

14. A computer program product (11) for model-based predictive control of a vehicle (1) taking into account an arrival time factor, the computer program product (11)

comprising instructions stored on a non-transitory memory, wherein the computer program product (11), when run on a processor unit (3), instructs the processor unit (3) to:
- calculate a trajectory for the vehicle (1) based at least in part on at least one arrival time factor, the trajectory including an entire route (20) to a specified destination (19) at which the vehicle (1) is to arrive, the at least one arrival time factor influencing an arrival time of the vehicle (1) at the specified destination (19); and
- optimize a section of the trajectory for the vehicle (1) for a sliding prediction horizon by executing a MPC algorithm (13), the MPC algorithm (13) includes a longitudinal dynamic model (14) of a drive train (7) of the vehicle (1) and a cost function (15), the cost function (15) including:
  - a first term, the first term being an electrical energy predicted according to the longitudinal dynamic model (14) and weighted with a first weighting factor, wherein the electrical energy is provided within the sliding prediction horizon by a battery (9) for driving an electric machine (8) of the drive train (7); and
  - a second term, the second term being a driving time predicted according to the longitudinal dynamic model (14) and weighted with a second weighting factor, the driving time being required by vehicle (1) to cover an entire distance predicted within the sliding prediction horizon, wherein the processor unit (3) is instructed to execute the MPC algorithm (13) as a function of the first term and as a function of the second term to minimize the cost function and determine an input variable for the electric machine (8).

\* \* \* \* \*